United States Patent
Spacek (10) Patent No.: US 9,085,950 B2
(45) Date of Patent: Jul. 21, 2015

(54) OIL WELL IMPROVEMENT SYSTEM

(76) Inventor: Joe Spacek, Brant Lake, NY (US)

(*) Notice: Subject to any disclaimer, the term of this patent is extended or adjusted under 35 U.S.C. 154(b) by 165 days.

(21) Appl. No.: 13/330,668

(22) Filed: Dec. 19, 2011

(65) Prior Publication Data

US 2012/0241160 A1    Sep. 27, 2012

Related U.S. Application Data

(60) Provisional application No. 61/459,895, filed on Dec. 20, 2010.

(51) Int. Cl.
| E21B 43/36 | (2006.01) |
| E21B 29/12 | (2006.01) |
| E21B 43/01 | (2006.01) |
| E21B 33/037 | (2006.01) |
| E21B 29/00 | (2006.01) |
| E21B 33/06 | (2006.01) |

(52) U.S. Cl.
CPC ............. *E21B 33/037* (2013.01); *E21B 29/007* (2013.01); *E21B 33/06* (2013.01)

(58) Field of Classification Search
CPC ..... E21B 29/007; E21B 33/037; E21B 33/06; E21B 29/08; E21B 33/063
USPC .................. 166/363–364, 338, 348
See application file for complete search history.

(56) References Cited

U.S. PATENT DOCUMENTS

| 4,283,159 A * | 8/1981 | Johnson et al. ................. 405/60 |
| 4,323,118 A * | 4/1982 | Bergmann .................... 166/96.1 |
| 8,025,103 B1 * | 9/2011 | Wolinsky ...................... 166/364 |
| 8,186,443 B2 * | 5/2012 | Wolinsky ...................... 166/364 |
| 2008/0302536 A1 * | 12/2008 | Kotrla et al. ................... 166/341 |
| 2011/0315393 A1 * | 12/2011 | Wolinsky ...................... 166/363 |
| 2011/0315394 A1 * | 12/2011 | Wolinsky ...................... 166/363 |
| 2011/0315395 A1 * | 12/2011 | Wolinsky ...................... 166/363 |
| 2011/0315396 A1 * | 12/2011 | Wolinsky ...................... 166/363 |
| 2012/0018165 A1 * | 1/2012 | Crossley et al. ............. 166/344 |
| 2012/0085543 A1 * | 4/2012 | Redden et al. ................ 166/339 |
| 2012/0186822 A1 * | 7/2012 | Mahajan et al. ............. 166/364 |

* cited by examiner

*Primary Examiner* — James G Sayre (57) ABSTRACT

Two functionally and physically integrated subsystems form a supplemental disaster preventive system for offshore oil wells. A multi-function well subsystem modifies the sea-floor and in-well equipment to provide maintenance access, tools to cap the well, seal/re-seal the well, drill/re-drill the well, kill the well from the top, improve BOP reliability, add BOP functional redundancy, improve the cementing process, incorporate a sea-floor pressure relief/diversion function and improve the well's life cycle safety. A dome top cylindrical sidewall structure encloses the well's sea-floor equipment providing improved structural strength as well as passive protection from natural/human induced disasters. An intrusion detection and response subsystem provides sensing, processing and communication devices to detect, track & classify the 3D aspects of air/surface/sub-surface objects around a specific oil well or group of oil wells and provides the means to evaluate and eliminate threats.

6 Claims, 7 Drawing Sheets

Advanced MFWS Overview

Adjunctive BOP / Access Valve Assembly
Sheet 2 - Mechanical

FIG. 3B

Platform to Well Interface Assembly

FIG. 4

Pressure Relief / Diversion Assembly

OIL WELL IMPROVEMENT SYSTEM

CROSS-REFERENCE TO RELATED APPLICATIONS

The present utility patent application claims the benefit of provisional application No. 61/459,895 filed Dec. 20, 2010.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to disaster prevention system for offshore oil wells and in particular to a supplemental disaster preventive system to provide means to insure human, equipment and environmental safety and associated cost avoidance during the offshore well drilling process under all conceived/feasible accidents/failures conditions. The overall system design concept, related procedures/processes and many associated system components to provide major cost reduction benefits for the entire life cycle (drilling, completion, production and abandonment) for both accident/failure and normal/uneventful operations.

2. Description of Related Art Including Information Disclosed Under 37 CFR 1.97 and 1.98

Shortly after the 2010 offshore oil well catastrophe in the Gulf of Mexico, it became obvious that British Petroleum (BP), the entire oil industry, and/or the US Government were unprepared to effectively stop the gushing oil or the means to clean it up.

Throughout the first two plus months of the disaster numerous re-sealing, capturing, clogging, killing and capping techniques were unsuccessfully attempted and several high risk/cost 'normal' well drilling processes were brought to light.

The successful 20 July re-seal, capture and cap 'Rube Goldberg'/'Kluge' (said with admiration) was a simplistic but effective temporary solution for the catastrophic symptoms of the problem—where the primary operative phrase is 'temporary solution for the catastrophic symptoms'.

The enormous somewhat/sometimes unquantifiable costs of the (or of a future) incident includes:
Human life
Environment
Drilling platform
Well (the equipment and the associated labor and its potential production)
Equipment and labor associated with the numerous re-seal, capture, and cap 'quick fixes'
Equipment and labor associated with the relief/kill wells
Gulf clean-up
Tourist and fishing industry
Local community
Public opinion relating to the oil industry and the government
Nation and international financial markets The prior art 'blowout prevender' (BOP) is intended to close off the well in case of an uncontrolled/emergency condition (blowout). It's a multi mega-buck, multi-ton device installed on the seafloor having various means/methods, with the design intent of closing a well. The most technically difficult is if/when a pipe and/or pipes (drill, casing, etc.) are within the well. The BOP must 'ram' through the pipe(s) and close off the well. That seems difficult, but add the extreme water pressure and low temperatures, the more extreme oil pressure and high temperatures and the prior art BOP is likely not going to work. After the Macondo's well was finally closed, the BOP was pulled up and evaluated—it was functional but did not do the job.

As offshore oil drilling/production continues in the future it seems only rational that the government as well as oil industry itself would demand, as a prime priority the development of improved equipment/systems and processes.

Whatever the cause(s) (human neglect/error, equipment failure, etc.) of the 2010 oil well disaster and whatever means are developed to insure no such similar failure and/or related impacts reoccurs, there are potentially more likely and more damaging events—specifically natural disasters and (accidental or deliberate) human intervention that must also be addressed.

The focus of the 'quick fix' was to stop/control the symptoms of the immediate catastrophe—the gushing oil.

What is needed is an overall systems design and implementation approach that provides the means to reduce/eliminate the causes and impacts of any conceived/realistic threats to oil wells in the future and further provides more reliable, practical and cost effective means to accomplish the oil well drilling task.

BRIEF SUMMARY OF THE INVENTION

The primary design objective of the present invention was to provide an offshore oil well improvement system using an overall systems design and implementation approach that provides the means to reduce/eliminate the causes and impacts of any conceived/realistic threats to oil wells in the future and further provide more reliable, practical and cost effective means to accomplish oil well drilling.

As the present invention design evolved it became apparent that many related procedures/processes and many associated system components provide major cost reduction benefits for the oil well's entire life cycle (drilling, completion, production and abandonment) in either problem or normal operations.

The present invention is composed of two functional and physically integrated subsystems, the Multi-Function Well Subsystem (MFWS) and the Intrusion Detection and Response Subsystem (ID&RS).

The MFWS is presented in two basic configurations, the 'Fundamental' & the 'Advanced'. Both configurations modify the sea-floor and in-well equipment to provide maintenance access and unique tools to provide the means to: cap the well, seal/re-seal the well, drill/re-drill the well, kill the well from the top, improve BOP reliability, add BOP functional redundancy, improve the cementing process, incorporate a sea-floor pressure relief/diversion function and improves the well's life cycle safety.

The Advanced MFWS includes a unique dome top cylindrical sidewall structure enclosing the well's sea-floor equipment providing improved structural strength as well as passive protection from natural/human induced disasters.

The ID&RS provides the means to detect, track and classify the 3D aspects of air/surface/sub-surface objects about a specific oil well or group of oil wells and provides the means to evaluate and eliminate threats.

As all elements are based on existing simplistic proven technology, the development cost risk is minimum.

As the system design includes a major focus on the physical implementation and operation, the implementation and operational cost risk is minimum Considering the pure human and environmental safety, the pure dollar and cents (or multi-million/billion dollar) cost avoidance and/or the potential cost savings/reductions (for any or all such reasons) it is a significant understatement to suggest that features of the present invention should be integrated with other planned improvements, and incorporated on all oil wells.

BRIEF DESCRIPTION OF THE SEVERAL VIEWS OF THE DRAWINGS

These and other details of the present invention will be described in connection with the accompanying drawings, which are furnished only by way of illustration and not in limitation of the invention.

The drawings are intended to provide an introductory overview of major system/system elements that along with other unique system supporting devices are comprehensively defined in the 'Detailed Description Of The Invention'.

The drawing further depicts the addition of two additional items, an Adjunctive BOP/Valve Assembly (AVA) (7) and a Platform to Well Interface Assembly (P-WIA) (8) in series with the 'typical' well's interface of (6) & (9). These two units are further shown on FIGS. 3A & 3B and FIG. 4. These units provide functional redundancy of the BOP (using alternative, simplistic technology) to seal/close the well. Unit (8) provides the means to seal the drill pipe's exterior wall return flow path while unit (7) closes the entire well's flow path when there no obstruction (drill pipes, casings etc.) within the valve area of unit (7). Note the drawing does not depict the drill pipe, drill bit or various casings that may be going into the well from the drill platform during the drilling stage. When in use these would be feed through items (9, 8, 7, 6, 5, 4, 3 & 2). It is further noted that the full 'functional redundancy of the BOP' is not yet complete in that the BOP can (by intent but with poor reliability) ram through an obstruction and close the well. The full 'functional redundancy' is provided by one of two alternate means. The first is the Enclosed Pipe Cutter within (7) and the second is the remote Pipe Coupling/De-Coupling device as shown on FIG. 6. In either case the cut or de-coupled pipe must be extracted from the valve area of unit (7). Such would be accomplished via the drill platform or a Remote Operated Vehicle (ROV) lifting the pipe/casing or the addition of an internal pipe lifting device (not shown). FIG. 1 further shows a Pressure Relief/Diversion Valve & Pipe/Tube (10) on a parallel well output port of unit 6. This provides an input to the Pressure Relief/Diversion Assemble as shown on FIG. 5. This provides the means to safely protect a problem well & platform, the means to safely capture the well output and the means to safely reduce/eliminate the disastrous effects on the environment.

FIG. 1 begins showing a 'typical' oil well's sea-floor equipment of a Stud (3), Marine Riser (4), BOP (5) & Sea-Floor (1) (as identified on FIG. 1 as 1, 2, 3, 4, & 5).

The Advanced MFWS differs by replacement the Production Valve Assembly with a unique manifold Domed Assembly (DA) structurally enclosing—reinforcing the well's sea-floor equipment. The DA consists of a Dome Cylindrical Sidewall (21), a Dome Top (22), and the Dome Interior Plate (23). The DA's lower section further includes Leveling Devices (24), Floor/Footing (25), & Vent Pipes (26). The Dome Top (22) includes parallel well outputs for the Normal Capture Valve & Pipe (11) & the Pressure Relief/Diversion Valve & Pipe (10) (functionally identical to 11 & 10 on FIG. 1). The DA upper section further includes a large ROV Access Port (27) that can be converted to the smaller port size of a normal BOP feed thru access by installing the Access Port Adaptor (APA) (28). Two sets of AVA's (8) & P-WIA's (7) are provided in series with the Normal Well Drill & Return Pipe (9). One set is connected to the BPO (5) via the BOP Output Adaptor (OPA) (32) and a Pipe Mounting Adaptor (PMA) (31). The other set is connected to the APA (28). The Dome Interior Plate (23) includes a Cable/Tube Access Hole and an associated Cable/Hole Sealer (29) (further shown on FIG. 3A). The interior area between the Dome Top (22) & Dome Interior Plate (23) and further enclosed by 28, 29, 31, 32, 10 & 11 is the Reservoir Area (30) sealed form the exterior sea water and is capable of holding well pressure.

The Housing (41) includes a physical area (42) below the Access Valve (43) that incorporates the EPC. The mechanical aspects of the EPC are shown on FIG. 3B. As a general reference the BOP Access Area (44) is shown as dashed lines. As a specific reference to the Advanced MFWS relating to the lower (ref. FIG. 2) AVA (7) & P-WIA (8), the Dome Interior Plate (23), PMA (31), OPA (32), Cable/Tube Access Hole & associated sealer (29) and AVA, P-WIA & DA control & monitor cables/tubes (45) are shown. In the case of the Fundamental MFWS the AVA (7) is directly connected to the Production Valve Assembly (6) and the upper set of AVA (7) & P-WIA (8) of the Advanced MFWS directly connects to the APA (28) (ref. FIG. 2).

Item 51 is a flat circular/donut shaped turn-table connected to the AVA housing via ball bearings. Item 52 (in dashed lines) reference the BOP's access area depicting the required centered opening of item 51. Item 53 is the turn-table motor assembly consisting of a motor, gearing, encoder & associated housing. The motor housing is attached to the AVA housing. The motor shaft, gearing & encoder interface with the turn-table. An item 54 (in dashed lines) represents the AVA housing under the turn-table. Item 55's are six Lateral Drive Devices.

Items 56 are three circular saw blades each including a motor & tachometer. Items 57 are three wedges. Items 58 & 59 are details of items 55. Item 58 is the fixed member of item 55. It is affixed to the turn-table and includes a lateral drive motor, an encoder, slides & gearing. Item 59 is the lateral sliding member of item 55 and includes slides & gearing. The dashed lines at item 59 indicate this member at its extended position.

Item 61 depicts the housing. Item 62 depicts the return flow opening/path. Item 63 is the remotely controlled by-pass valve allowing (return) flow around a sealed pipe outer wall to return. Items 64 are remotely controlled expandable 'o' ring gaskets capable of closing the area between the interior pipes outer sidewall and the AVA's housing (the return path). The dashed lines at items 64 show the said gasket expanded. Item 65 is a sample pipe within the P-WIA. Item 66 is a reference to the Normal Well Return Pipe going to the drill platform. This reference is applicable to the Fundamental MFWS & the upper P-WIA of the Advanced MFWS. The lower P-WIA of the Advanced MFWS is opened to the Reservoir. Item 67 (in dashed lines) is a reference to the BOP's access feed-thru area.

Item 71 is the Containment/Separator Tank. Although not shown it is assumed internal elements would provide enhanced oil-water-mud-gas separation beyond that obtained by a simplistic internally opened tank. Item 72 is the Ballast required to stabilize the tank to the Sea-Floor (1) as the tank takes on different elements (initially filled with sea water and latter replaced with mud, oil & gas). Items 10 & 11 are references to the Pressure Relief/Diversion Valve and the pipe/tubing coming from the well as seen on FIGS. 1 & 2. This pipe/tube extends horizontal from the well's sea-floor equipment to a safe area where any possible release of oil/gas from the well will not impact the safety of the surface equipment or personnel. Item 73 is a composite of numerous controls and internal tank monitoring/sensors interfacing with the surface equipment. Items 77 are pipes/tubes to further divert and/or capture the tank's separated holdings. It is assumed the different separated outputs would go to different places (such as oil to a surface containment area or capture vehicle while the gas may be diverted to a further safer area father away from the oil containment/capture area). Items 74, 75 & 76 are remotely controlled valves. Item 74 is the Sea Water/Mud Valve and would initially be opened in conjunction with the Pressure Relief/Diversion Valve to allow the tank to extract its initial sea water and accept the wells output. As sensors indicate the tank no longer contains sea water/mud the valve would be closed. Item 75 is the Gas Valve. If gas is sensed within the tank this valve would be opened. Item 76 is the Oil Release Valve. As oil is sensed within the tank this valve would be opened.

Items 81 are the upper end & lower end of the upper & lower coupling pipes. These ends have standard pipe to pipe coupling means. Item 82 (in dashed lines) indicates the inside wall. Item 84 is the smaller diameter upper pipe coupling surface that fits within the lower coupling pipe as indicated by the dashed lines of Item (90). Item 89 depicts a tapered the bottom portion of item 84 allowing it to initially align/fit into the lower section. Item 83 is the upper pipe's mounting flange & gasket that mates to the lower pipes mounting flange item 91. Item 92 is a unique threaded element in the interior sidewall of the lower pipe. The 'unique' threads have a stepping characteristic as shown on Detail 'B' item 93. The widths of the individual steps are slightly larger than the width of the remote controlled Spring Loaded Grabbing Device (SLGD), item 85. Items 85 are installed on the upper coupling pipe via Pivots (87) and normally extend out from the sidewall via its internal spring. When compressed the SLGD fits into the pipe's sidewall per item 88. Detail 'A', item 94 indicates a sloped mating (mating the slope of item 93) of the SLGP. As the upper & lower sections are joined the SLGDs compress into the sidewall and springs in & out of the different levels of the stepped threaded element. When the mounting flanges bottom-out the upper pipe is turned clockwise (where it ratchet into, further tightens and locks into the threaded—stepped element. The pipes de-couple via energizing the SLGD remote control mechanism, item 86 where the SLGD is pulled into its sidewall unlatching/freeing the two pipe sections.

DETAILED DESCRIPTION OF THE INVENTION

The system of the present invention comprises two functional and physically integrated subsystems, the Multi-Function Well Subsystem (MFWS) and the Intrusion Detection and Response Subsystem (ID&RS).

Both MFWS configurations (Fundamental and Advanced) utilize 'other' (not shown on Figures) unique support devices including:
Production Hard Cap (PHC)
Remote Monitor and Control Unit (RM&CU)
Re-Case End Pipe (R-CEP)
Re-Case Pipe (R-CP)
Bottom Kill End Pipe (BKEP)
Kill Pipe (KP)
Modified Conversion Float Valve (MCFV)
Modified Casing (MC)
Modified Reamer Shoe/Drill Shaft (MRS/DS)
Modified Drill Bit (MDB)

The Production Hard Cap (PHC) is a simplistic device. It is round as viewed from the top and has a mounting surface compatible with both the Production Valves and the Production Ports. The PHC is utilized to provide means to cap each individual unused Production Port and/or Valve.

The Remote Monitor and Control Unit (RM&CU) is a platform mounted specialized device associated with the Multi-Function Well Subsystem (MFWS).

The RM&CU will provide the surface platform to sea-floor and in-well equipment man-machine monitor & control interface.

The RM&CU will include processing capability to provide operator recommendations and warnings, as well as an automatic mode to control the sea-floor and in-well equipment for critical/emergency situations.

Although specific operational displays, modes, functions or controls are not specified in detail at this time, it is assumed the RM&CU equipment (such as monitors, computers and interface devices) matching/exceeding the system requirements are commercially/off-the-shelf available.

The Re-Case End Pipe (R-CEP) is a pipe section smaller in diameter than the installed well pipe/casing in need of repair when the drill pipe is not in the well. It will have a remotely controlled initially closed bottom end valve, a remotely controlled expandable 'o-ring'/gasket around its outer circumference near the closed end. It will further have a remotely controlled sidewall gate valve located slightly above the said gasket. Prior to installing the R-CEP the number of sections of Re-Casing Pipe (R-CP) required to repair the well must be determined. At a point above where the existing well pipe is in need of repair but below the BOP, a pair of remotely controlled Coupling/De-Coupling Pipes shall be joined, followed by additional sections of R-CP from above the bottom of the BPO to the surface platform. The R-CEP and R-CP would be lowered through the 'normal outer/return drill pipe' to the desired location.

The R-CEP gasket would be energized sealing/closing/choking the pipe to pipe area. The sidewall remotely controlled gate valve will be opened and mud followed by concrete would be pumped directly into the re-casing pipe. The mud/concrete flows through the opened gate valve and into the pipe/casing in need of repair to seal the pipe to pipe/casing area. The concrete will flow through said area until cement is detected in the pipe to pipe area above the last (highest) section of well pipe that needed repair. The concrete pumping will stop, the sidewall gate valve will be closed and the concrete will be removed from the interior of the Re-Case Pipe. The bottom remotely controlled closed end valve will then be opened. The concrete is let to set between the pipe to pipe areas. The Re-Case Pipe (below the BOP and above the well pipe that require repair) will be uncoupled via the Coupling/De-Coupling Pipe (or will be cut and extracted).

The Re-Case Pipe (R-CP) is similar to the lowest section of the installed faulty well pipe/casing except:
  Smaller in diameter.
  Selected sections (the uppermost as a minimum) shall incorporate remotely monitored exterior pressure, oil, water, mud and concrete sensors.

The Bottom Kill End Pipe (BKEP) is similar to the R-CEP except:
  The 'initially' closed bottom end will also have a permanently closed section above it.
  The volume between the initially and permanently closed portions will contain pre-loaded 'junk', along with a remotely controlled means to open the bottom and release the 'junk'.
  The 'junk' will be of various size material, flexible, buoyant (in oil) and capable of withstanding well pressures and temperatures.
  Will not include the remotely controlled circular hydraulic controlled gasket around its outer circumference near the closed end, but instead will include a large expandable remotely controlled end plug (similar to an expandable pipe plug). The 'large' plug will be capable of expanding to the diameter of the well bore.

The large plug will be set below the well casing and the plug would be expanded. The initially closed bottom end will be opened releasing the junk further sealing/clogging/choking the well.

Mud followed by concrete would be pumped through KP in a similar manner as the Re-Case Pipe except the concrete will also flow into the well bore and the concrete will not be evacuated from the pipes interior. The upper sections of pipe will be removed in a similar manner as the Re-Case Pipe.

The Kill Pipe (KP) is similar to the R-CP except the 'selected sections'(the uppermost as a minimum) shall incorporate remotely monitored interior (as well as exterior) pressure, oil, water, mud and cement sensors.

The Modified Conversion Float Valve (MCFV) changes the release method/mechanism from the present dropped ball, semi obstructing the flow through a pipe holding the valve opened causing a delta pressure. When/if the delta pressure and flow meet a pre-selected criterion, the said pipe releases and converts the device to a one-way valve.

The modification converts the valve to an electrical remote controlled device—activating a solenoid. The opening valve will further be spring loaded and its opening will be sensed and reported and remotely monitored as flow-rate.

The Modified Casing (MC) incorporates remote controlled sidewall gate valves near the top of the casing. Although the MC is primarily intended for the lower most casing, it could be desirable for other casing sections as well. The said valves would be initially being held closed. Upon command the valves will allow one-way flow, from the pipe into the wellbore. This will allow cementing from the top of the casing to the bottom, reducing the required pressure and further provides a more positive void/bore fill.

The Modified Reamer Shoe/Drill Shaft (MRS/DS) modifications combine the functional elements of the R-CEP and the BKEP with the following alterations:
  The 'large' 'plug' element of the BKEP is incorporated on the lower part of the shaft/collar slightly above the shoe or drill bit to seal/clog/choke the well bore to drill shaft/collar.
  Incorporates a remotely controlled gate valve device internal to the pipe, just above the drill bit to restrict flow through the drill bit.
  The remotely controlled 'o-ring' pipe to pipe sealing gasket around the pipes circumference incorporated on the R-CEP shall be re-located to above the controlled gate valve.

The intent of the MRS/DS is:
  Similar to the BKEP by providing the means to kill the well below the last pipe in the well bore, but with the reamer/drill shaft in the well.
  Similar to the R-CEP by providing reliable means to re-case (specifically the pipe to pipe cementing process), but with the drill shaft/collar and/or the Reamer Shoe in the well
  To provide improved reliable means to cement the last pipe to the well bore.

The 'Fundamental' MFWS provides maintenance access, redundancy, sea-floor pressure relief/diversion means and utilizing common unique and in-use apparatus and tools, used in conjunction with a newly devised oil well access to provide the means to:
  Cap the well
  Seal/re-seal the well
  Drill/re-drill the well
  Kill the well (at the bottom from the top)
  Improve BOP(s) reliability
  Improve means to end casing The 'Advanced' MFWS includes all the features of the above, and further includes a unique dome top, cylindrical sidewall assembly/structure enclosing the well's sea-floor equipment providing improved structural strength and protection from natural/human induced disasters.

Either the Fundamental or Advanced MFWS configurations could be modified to include an additional Adjunctive BOP/Access Valve Assembly (AVA) installed below the BOP providing further redundancy.

MFWS Detail Design Notes/Information
  The dome's size is determined by the wells characteristics. The primary factor is the height of the wells above sea-floor equipment (Marine Riser and BOP and newly installed adaptors/assemblies—OPA, PMA, and AVA and P-WIA) followed by the margin of safety associated with the:
  The lateral stability of the DA (diameter to height ratio).
  The sidewall strength beyond that required to support the top members—where the 'beyond' is the strength to compensate for falling objects/underwater blasts
  The height and width of the required maintenance area (ROV workspace)

The overall 'Dome Assembly' size shall be as small as possible but its sidewall height shall be greater than the existing wells sea-floor equipment (Marine Riser and BOP)—(generic/ball-park height >60').
The sidewall diameter will provide lateral stability of the Dome Assembly and have a surface area compatible with all required dome top ports.

(>two third the height, generic/ball-park diameter >40')
The initial (pre-cementing) weight of the Dome Assembly shall be slightly greater than the weight to sink it to the sea-floor, But if prior to its installation, the well head is opened and under pressure and can not be controlled/stopped, then weight must be added to overcome the well pressure. The added weight shall be determined assuming all top ports/valves opened (the said ports/valves would be opened during the normal installation/setting process).

The top domed member (dome top and interior plate forming the reservoir) shall be made of material and joined in a manner to withstand greater than two times the wells' anticipated pressure. The cylindrical sidewall of the dome is fabricated with material and supporting braces capable of supporting the top (domed) structure and act as a concrete form to structurally connect the dome top section to a concrete floor pad. The center interior will include installation positioning/guide braces about the locations of Marine Riser, BOP and BOP Output Pipe Adaptor. The sidewall may be made of two or more vertical separable sections enabling sea-floor equipment changes for the completion-production phases (if/as desired). The exterior of the sidewalls will include a minimum of three horizontally extending 'L' brackets. The brackets will support remotely controlled leveling jacks capable of lifting/leveling the pre cemented Dome Assembly. The dome top to sidewall mechanical interface shall include lifting hooks/eye-bolts and shall be capable of supporting the DA's initial (pre-cemented) weight.

After the DA is set (positioned and leveled) on the sea-floor, pressure relief vent pipes (approximately 3-4 feet long) will be vertically set in the sea-floor having the vent pipes be semi-evenly spaced in the floor and encompassing an area approximately five percent of the total sea-floor area, and a concrete floor (approximately 3 feet deep) will be poured (structurally connecting the Well Stud to the sidewall).

The cylindrical sidewall will include an opening the size compatible with passing through a 'typical' off-shore oil well's ROV. The opening will be enclosed by a door. The door will include pressure relief/venting means allowing higher internal pressure to be released, while sealing the interior from higher external pressure.

The center of the dome top will house a large access port. 'Large' is defined as the area capable of passing through a device the size of an ROV. The port will be initially used to access the interior of the dome during installation and latter for repair/replacement on assemblies within the dome. The exterior of this port area will include guide-pins and bolt studs to mechanically secure an Access Port Adaptor (APA).

The APA reduces the port size and is used to connect various assemblies/adaptors for well pipe drilling, sealing repair and abandonment processes (killing), Off-center of the access port will include several production sized ports. The exterior of these ports will include the means to secure a Pressure Relief/Diversion Valve, Production Valves or Production Hard Caps. These mounting elements (pins and bolt studs) shall be identical (size, spacing and pattern) on all Production Ports.

These ports/valves will be initially opened (as well as the Access Port) during the Dome Assembly (DA) installation (lowering and positioning). The ports/valves are initially used for pressure relief/venting and latter used for production—or will be capped.

The Dome Assembly will include numerous standard (non-unique) remotely monitored/controlled equipment such as:
  Levels.
  Internal and external closed circuit T.V. (s) and associated lights.
  Pressure sensors.
  Oil, water and gas detectors
  All assemblies/adaptors/tools shall include the following where applicable:
Be made of material capable of withstanding greater than twice the well's pressure
Supporting means compatible with lifting, lowering and positioning the unit from the surface platform and ROV(s)
Top and bottom mounting surfaces' compatible (size and shape) with the units they physically interface with
Top and bottom mounting hardware (bolt studs, guide-pins) and compatible (size and pattern) holes and captivated securing components with the units they physically interface with:
  Mounted gaskets compatible with the size and shape of the unit and the unit it physically interface with
  The means to remotely remove and replace all internal functional elements by a ROV(s)
  Remotely controllable devices shall be designed using electrical, fiber-optics, mechanical, hydraulic and/or pneumatic means with connections compatible with a ROV(s) capability to install/remove.
  There are many different 'working' pipe sizes and the expandable seals of the P-WIA will likely not be capable of handling, therefore different sized P-WIA s' or inserts must be provided.
  Varying levels of pressure could be applied to the P-WIA's seals allowing for a fully opened, to fully a hard sealed, as well as intermediate levels allowing for rotating and vertical pipe movement as well as sequencing the said pressure from the upper & lower seals as the pipe joints pass thru the unit.
  The functionally/performance of numerous MFWS unique equipment/tools require or would be enhanced with the addition of an 'in-well' monitoring & control interface. Numerous interface structures could be employed to provide this function. Although the intent of this document is to provided a 'system level' design the following is provided as design information/specifications/requirements for this interface as follows:
Design.
Embedded Fiber-Optic (FO) cable within the drill pipe sidewall.
Compression pipe to pipe FO connections.
Directly connect sensors and controlled devices attached to the drill pipe to the said cable.
Sensors and controlled devices not directly attached to the drill pipe interface via non-physical contact means of coded Light/IR/RF and/or acoustic interface devices (such as a garage door opener or 'Easy-Pass' type device).
Sensor and controlled devices powered by batteries.
Controlled devices using hydraulics would use battery power to activate (in-well) pumps with initial pressure equalization means.
Notes/Requirements:
  The FO bandwidth is orders of magnitude greater than required (but provides a convenient bi-directional capability)

The sensors will include addresses (digital/frequency codes) capable of any future conceivable need.

The following define the minimum required simultaneous functionally, which basically defines/limits the requirements of the controlling/monitoring unit.

25 discretes—yes/no (such as sensed gas)

15 levels indicators with ten to the $5^{th}$ dynamic range (such as well pressure)

15 controls (such as turn on/off)

15 control status/feedback

Figure 1:
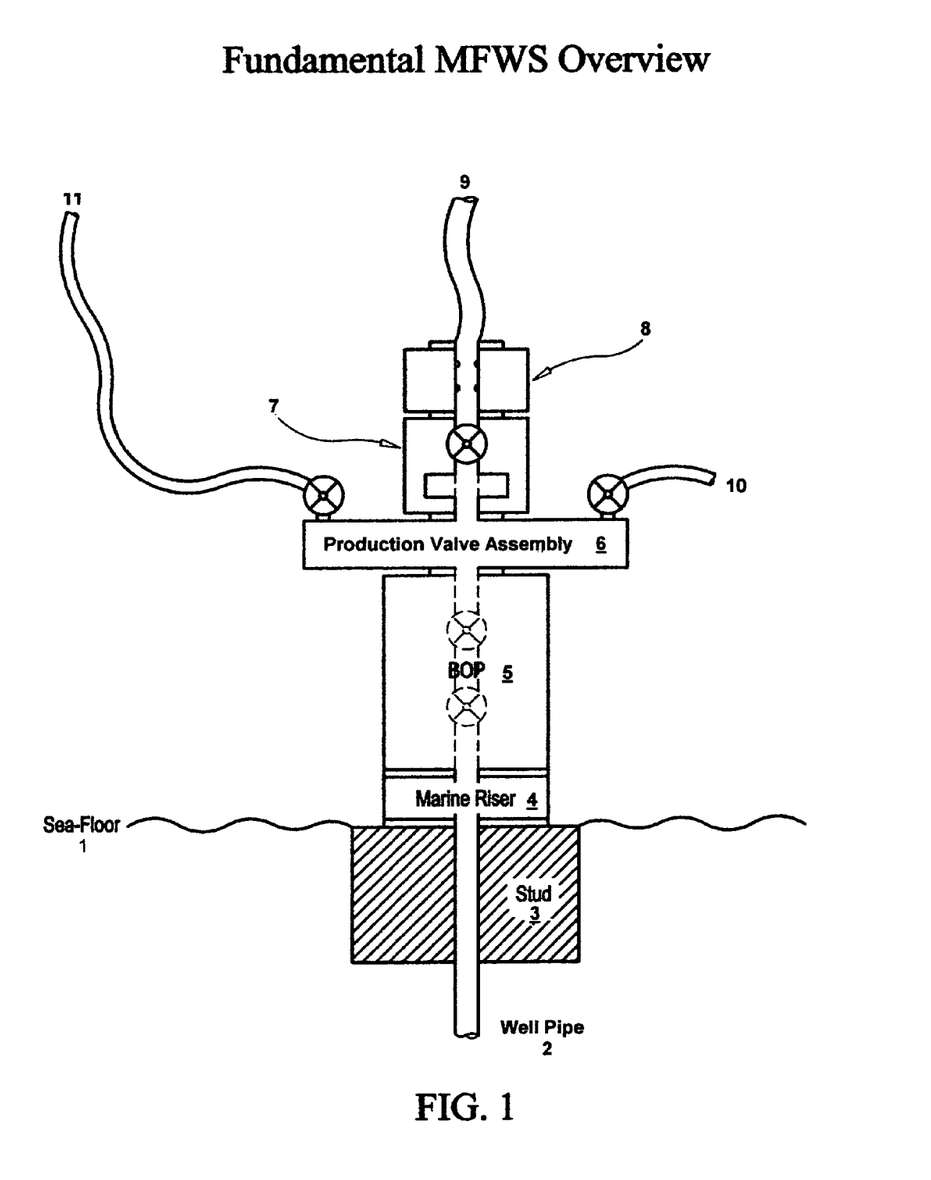
FIG. 1 is a diagrammatic cross-sectional view of the Fundamental Multi-Function Well Subsystem (MFWS) showing a typical oil well's sea-floor equipment of a Stud (3), Marine Riser (4), BOP (5), Production Valve Assembly (6) and Well Pipe/Casing (2) sitting on the Sea-Floor (1). Connected to this 'typical' equipment is a 'Normal' Capture Valve & Associated pipe (11) going to a surface capture platform and a well drill & return pipe (9) 'typically connected to (6) going to a surface drilling platform.
Figure 2:
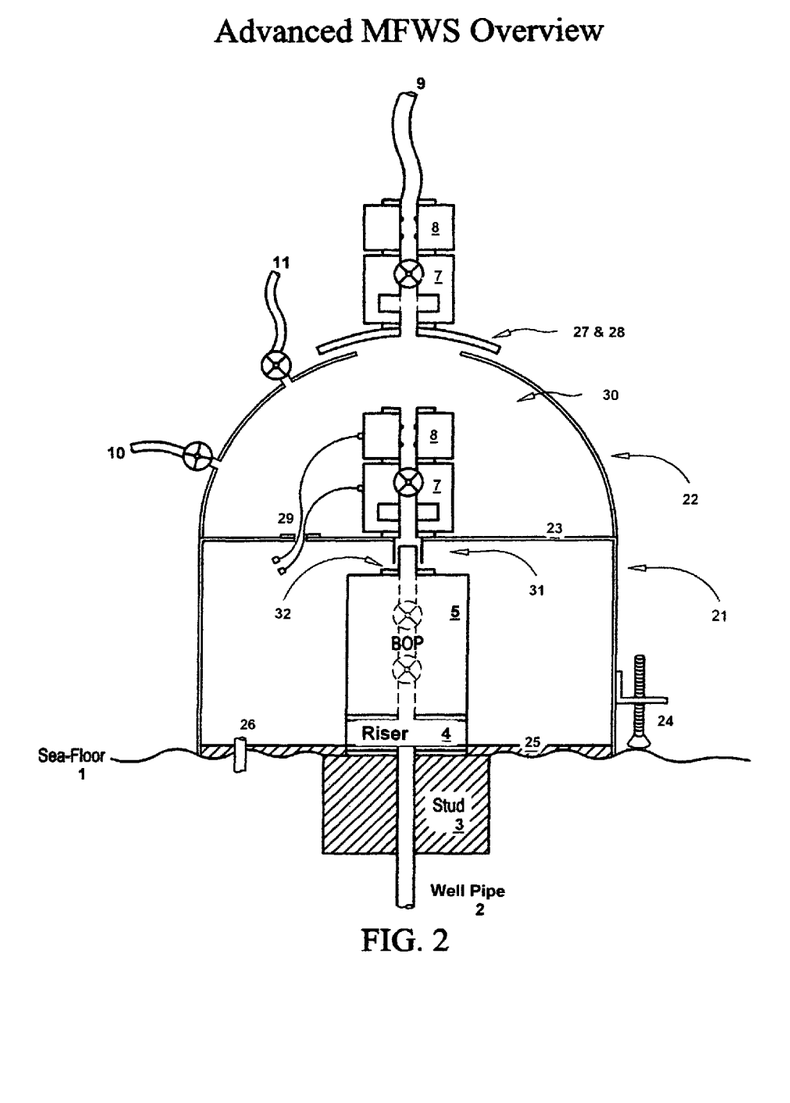
FIG. 2 is a diagrammatic cross-sectional view of the Advanced Multi-Function Well Subsystem (MFWS) in a similar fashion to FIG. 1.
Figure 3A:
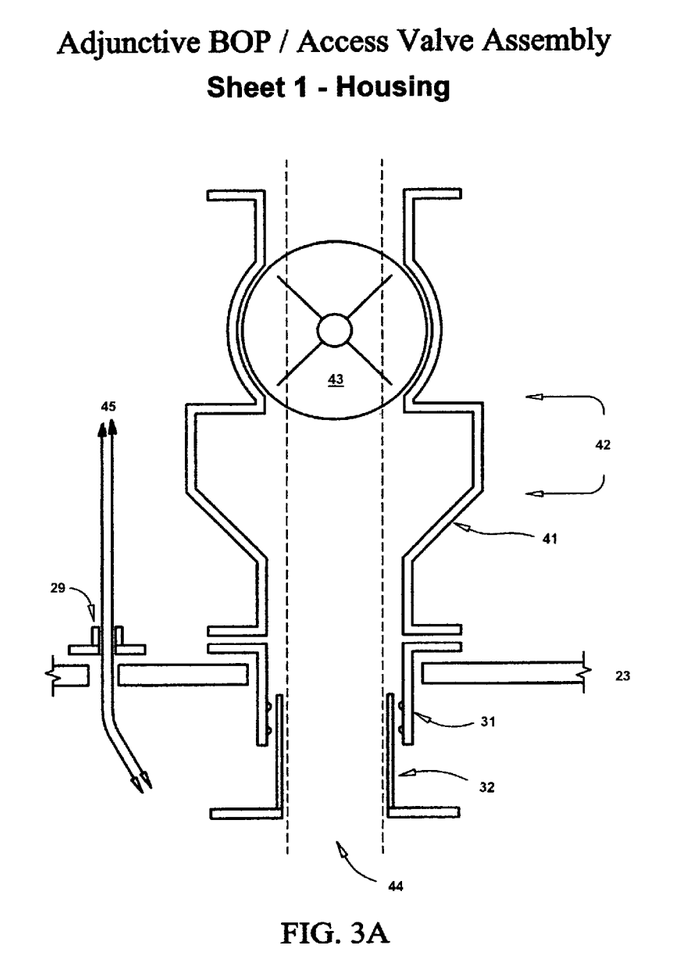
FIG. 3A is a diagrammatic cross-sectional view of the Adjunctive BOP/Access Valve Assembly (AVA)-Housing with an Enclosed Pipe Cutter (EPC).
Figure 3B:
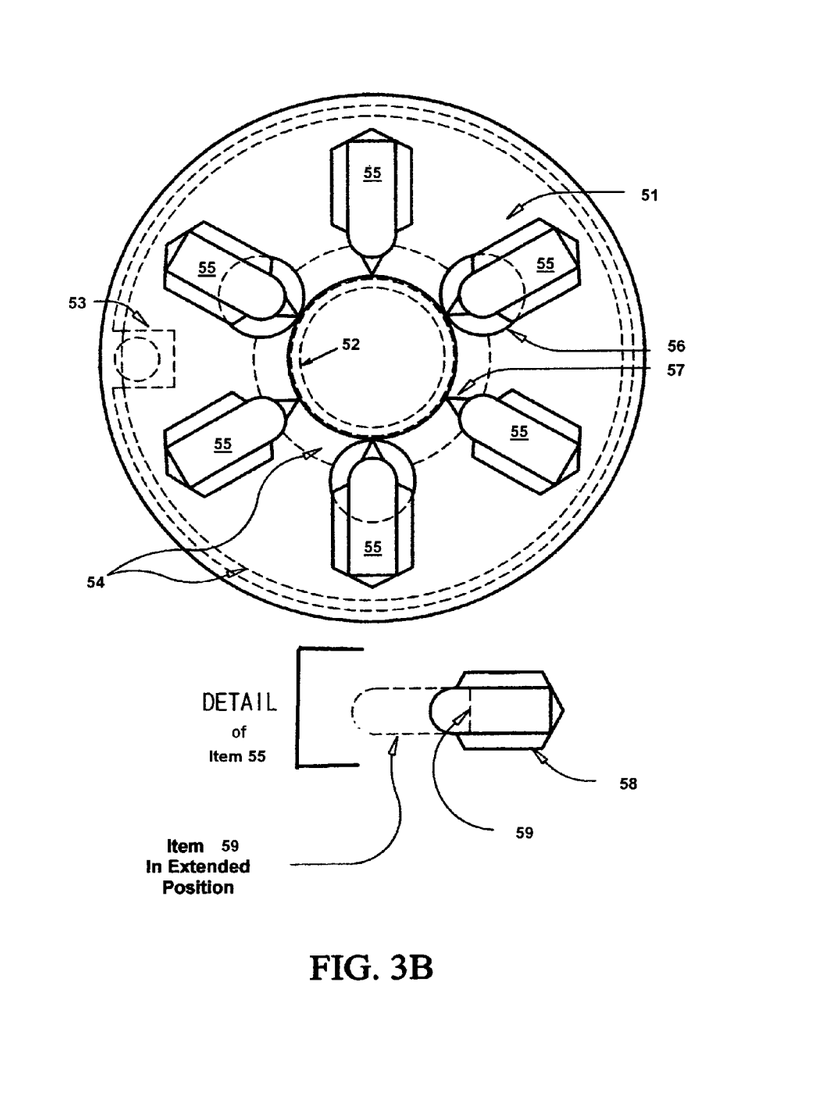
FIG. 3B is diagrammatic cross-sectional top view, at the EPC elevation depicting the mechanical aspects of the Adjunctive BOP/Access Valve Assembly (AVA) with EPC.
Figure 4:
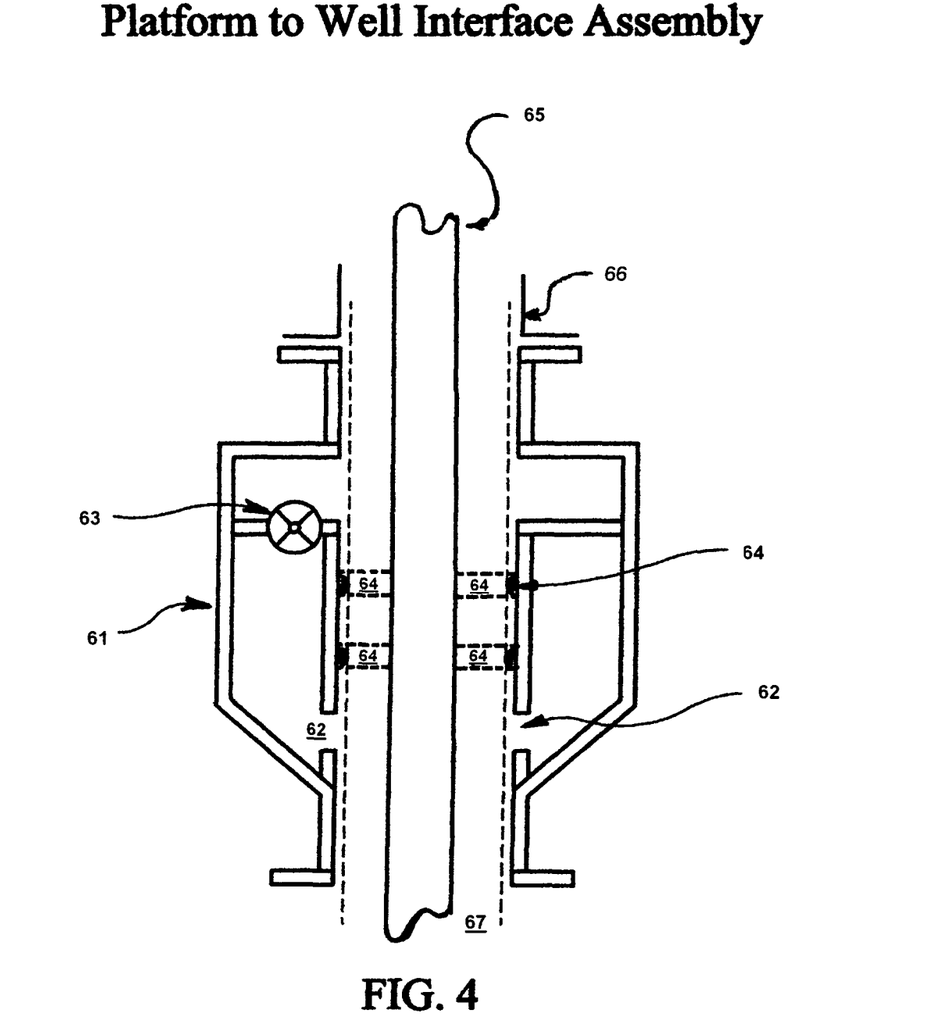
FIG. 4 is a diagrammatic cross-sectional view of the Platform to Well Interface Assembly (P-WIA).
Figure 5:
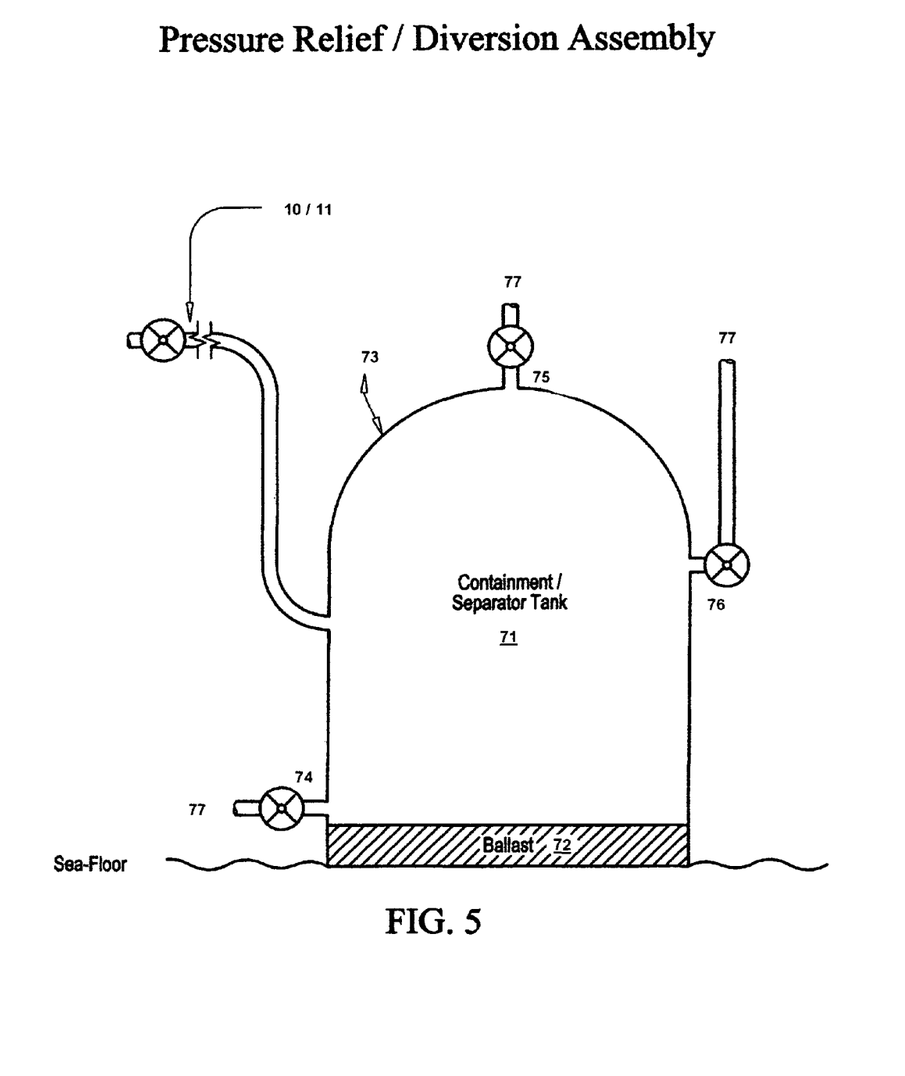
FIG. 5 is a diagrammatic cross-sectional view of the Pressure Relief/Diversion Assembly.
Figure 6:
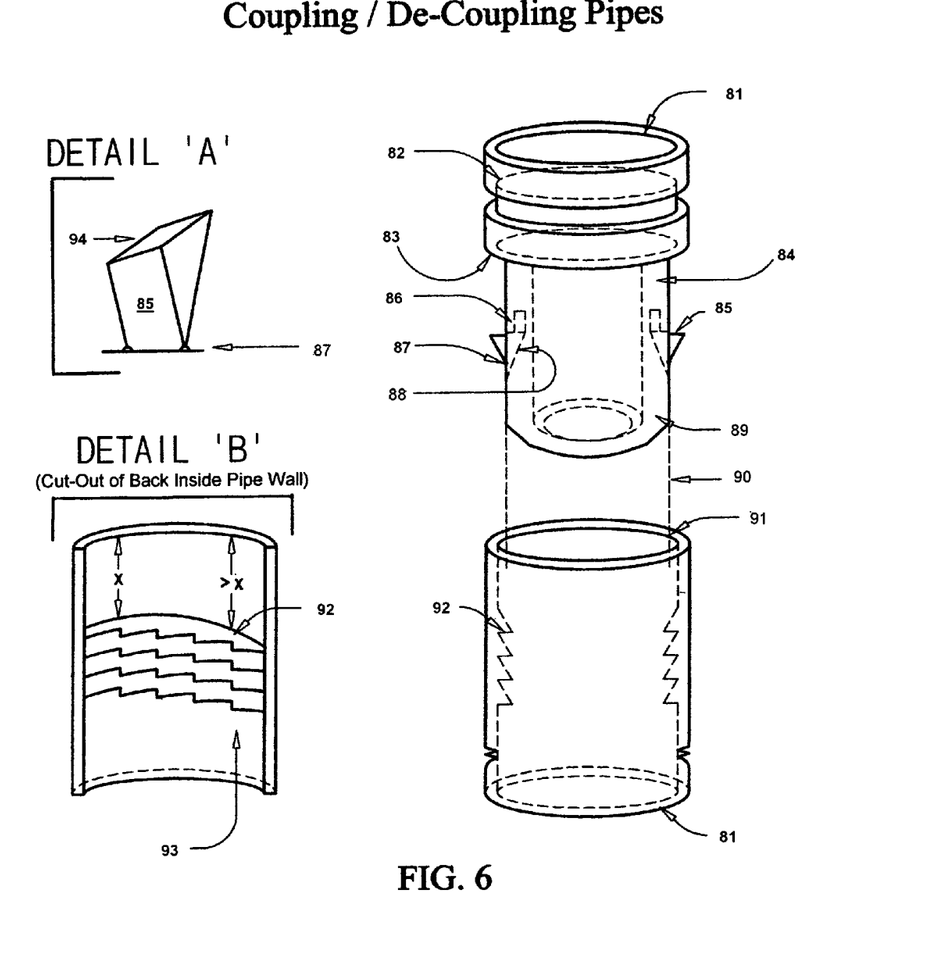
FIG. 6 is diagrammatic perspective & cross-sectional views of a matching/mating pair of the Coupling/De-Coupling Pipes.

The sequence of operations of the Pipe Cutter Mechanism will be initiated by an operator at the Remote Monitor and Control Unit (RM&CU). In the automatic operational mode, after being 'initiated', an embedded microprocessor and program in the RM&CU will control and perform the cutting process described below. In a manual mode the operator will perform the steps below:

1. An operator at the RM&CU will initiate a pipe cut defining a given size pipe.
2. The Circular Saws and Lateral Drive Devices drives, with minimum torque contacts the pipe to confirm the designated pipe size. If different informs the operator.
3. If the pipe designated is confirmed the proper size, the saw motors are turned on and laterally driven into the pipe until either the thickness of the pipe-wall is penetrated or the saw motor speed decreases greater than 20%. If the latter occurs see * (below).
4. When the pipe-wall is penetrated, the Turn-Table Motor turns on and continues to cut the pipe until either the Turn-Table turns to where the pipe is cut by each saw 110 degrees or the saw motor speed decreases greater than 20%. If the latter occurs see * (below).
5. When three saws have cut the pipe 110 degrees, Circular Saws and Lateral Drive Devices retract the saw blades and: The Turn-Table is positioned at 120 degrees.
6. The Wedges' Lateral Drive Devices is activated pressing the wedges into the pipe cut.
7. The Circular Saws' Lateral Drive Devices is again activated to drive the saw blade towards the pipe until either the thickness of the pipe-wall is penetrated and the pipe is fully cut or the saw motor speed decreases greater than 20%. If the latter occurs see * (below).
8. Once the pipe is fully cut it must be extracted. If another pipe needs to be cut, the first pipe must be pulled clear of the pipe cutting lateral drive mechanism.

*If any of the saws speed decreases greater than 20% from its unloaded speed, the appropriate drives will be backed-off until the no-load speed is obtained. The drives will then proceed to the continuing cutting process.

The objective of the Intrusion Detection and Response Subsystem (ID&RS) is to protect the surface and underwater oil well elements from deliberate human intervention. It is assumed a 3D restrictive zone will be established about an individual or group of oil wells.

The ID&RS provides the means to detect, track and classify the 3D aspects (bearing, range, and depth) of air/surface/sub-surface objects about a specific oil well or group of oil wells. It also provides the means to evaluate potential threats and 'Hard and/or Soft Kill' threats.

The ID&RS elements are identified in four categories as follows:

1. Major existing military type platform equipment that provides short range AAW, ASUW and ASW capability including such items as:

Radars (search and fire control).
IFF
ESM
Sonar
Active and Passive Decoys (Acoustic, RF and IR).
Hard Kill Weapons (guns, missiles, torpedoes and depth charges).

2. Major existing military/commercial type equipment such as:
LAMPS Helicopter
ROVs 3. Unique equipment such as:
Array(s) of sea surface tethered remotely controlled RF and IR generators/decoys.
Array(s) of below sea tethered remotely monitored Passive Acoustic Sensors (PAS) and a platform mounted PAS.
Remotely controlled acoustic generators/decoys and remotely controlled acoustic corner reflectors.
Interface, Processing and Display Monitor and Control.

4. Trained Operator(s).

Many of the terms such as 'short range' and 'weapons' are quite subjective and since the primary threat is considered to be quite rudimentary the following are identified as design guidance:

A Radar (search, fire control and integrated IFF) capability such as the MK92 CAS.
Weapons such as the Standard Missile, Harpoon and Mk46 Torpedoes would work but have a significant over kill for the anticipated threat.
Hard Kill weapons could include such items as a MK15 CIWS, a 3" gun, SUBROC and Helicopter launched depth charges and shoulder type fire and forget anti-air and anti-surface missiles.

ID&RS Detail Design Notes/Information

The acoustic sensors and arrays are conceptually based on USN ASUW and ASW detection and processing techniques. The subsurface piggy-back depth angle sensor and the related arrays depth determination is unique but based on the triangular processing of the bearing and range. It is anticipated the sensed 'depth angle' will be compromised by sea-floor and surface reflections/bounce, but it is assumed that integrating over time and averaging the three differently located sensors data will provide tangible results. The tracking, classification, threat analysis and threat response recommendations are also based on USN processing.

The RF, IR and acoustic generators and corner reflector(s), and their associated array, are conceptually based on USAF and USN air tactical counter-measures (stand-off jammers and gate stealers) and USN submarine counter-measures (decoys).

The Light Airborne Multi-Purpose System (LAMPS) operations are based on the USN LAMPS MK111 ASW and ASUW techniques.

The following describe a single well installation utilizing a USN or USCG Ship for the 'Major existing military type platform equipment that provides short range AAW, ASUW and ASW capability'.

It is assumed alternative interfaces, operations and array configurations could be derived for well platform based equipment and/or multiple well implementations.

The Radar and associated IFF and Electromagnet (passive detection) Sensor (EMS) are the 'eyes' for above the surface, while the passive acoustic sensors are the 'eyes' for below the surface.

The acoustic sensor array provides subsurface and surface detection data and the means required to triangulate the sensors detections to determine Bearing, Range and Depth.

The outputs of the acoustic sensors* and control signals for all generators (RF, IR and acoustical) interface with (via cable) an Array Distribution Unit (ADU). The ADU (data/controls) interfaces (via cable) with to the Data and Signal Formatter (D&SF). D&/SF on a (oil well) platform digitizes and serializes the signals. The digitized and serialized signal is sent to the platforms RF Data Link and then the ship's RF Data Link. The data is then sent to the Processor where is processed for display monitoring and display interface, detection support (bearing, range and depth determination for acoustic contacts) and tracking, classification, threat analysis and related recommendations, as well as historical storage for air, surface and subsurface contacts.

The processed data and information is then sent to the Display Monitor and Control Unit. A trained Operator views/reviews the data and information and determines and initiates appropriate actions.

The processing will include an operator selectable auto threat-quick reaction 'soft-kill'/decoy mode, allowing the program to automatically control the RF, IR, acoustical generators and corner reflectors.

The controls are sent to the appropriate selected unit(s) (specific sensor and/or generator) via the Processor, RF Data Link, Data Formatter, Array Distribution Unit and then to the appropriate unit. LAMPS Helicopter interfaces via its own data link.

If ROV actions are required, a stand alone interface, monitor and control system identical to the existing ROV's will be used.

If the Ship has a sonobuoy receiver system compatible with the number and type of sonobuoys in the array the sensors could directly (via RF) interface with the ship.

It is assumed the sensor (RADAR, IFF, and ESM etc.) and weapons on a USN or USCG Ship identified as short range AAW, ASUW and ASW capable would well serve this mission, particularly as supplemented.

The RF and IR Generators/Decoys are standard simplistic active noise or repeater source similar to numerous such devices used by the USN and USAF. The device shall be externally stimulated and controlled by the Processor to produce outputs capable of:

Being totally silent.

Producing broadband continuous wave frequencies over the entire spectrum of anticipated homing devices, at power levels greater than the anticipated homing device's transmitter.

Producing a controlled variable delayed pulsed repeater outputs compatible with the pulse-width and spectrum of an anticipated active pulsed homing device. The controlled variable delay shall have a minimum range from; <1 us to greater than 10 ms. The repeater will further have controlled power levels from a maximum equaling the anticipated power of a homing device's transmitter, to minimum power level of zero.

The Passive Acoustic Sensor (PAS) is derived from a modification of the standard AN/SSQ 53 Directional Frequency Analysis and Recording (DIFAR) Sonobuoy.

The low-tech modifications include:

Providing an external power source via cable (vs. internal battery power).

Removing the antenna output interface and utilize output via cable interface format.

Mounting two unit's piggy back on different axis (one producing bearing angle and the other depth angle).

Increase buoyancy to insure unit with attached cable (and attached Acoustic Generator has significant positive buoyancy.

The Acoustic Generator (AG) is a simplistic active acoustic noise source similar to numerous such devices used by the USN.

The device shall be externally stimulated and controlled by the Processor to produce outputs capable of:

Being totally silent.

Emulating the acoustic signature of an oil well's sea-floor and platform, with power levels equal to ten times the said well.

Producing broadband continuous wave acoustic frequencies over the entire spectrum of anticipated homing devices, at power levels greater than an anticipated homing device's transmitter.

Producing a controlled variable delayed pulsed repeater output compatible with the pulse-width and spectrum of an anticipated active pulsed homing device. The controlled variable delay shall have a minimum range from; less than 10 us to greater than 10 ms. The repeater will further have controlled power levels from a maximum equaling the anticipated power of a homing device's transmitter, to a minimum power level of zero.

The Acoustic Corner Reflector (ACR) is a simplistic passive decoy type device. It is basically composed of two flat acoustical reflective crossing plains (crossing in the center) at 90 degrees that reflects an acoustical signal back in the same angle it was received. The ACR further includes a remote controlled element that rotates (from the center) one of the plains to form a dual flat surface. The ACR is deployed with weighs on the sea-floor and/or tethered at different depths.

The PAS and AG units will be connected (via cable or be physically joined) and typically deployed in functional sets of three or four typically @ equal distance from each other and equal distance about a specific well (or in other functional sets about a group of wells).

Each of the PAS, AG and/or ACR units will be tethered from the sea-floor to pre-determined depths. The RF & IR generators will be tethered to the sea surface.

The said tethered cables could include various combinations of sensors/decoys.

The sea-floor will hold the tethered cable with weights capable of insuring it does not change its position (depth, lat. and long.). The cable length from the tethered weight to the sea-floor to platform shall be the planned distance plus about one and a half times the sea depth (for future recovery/maintenance). A single (non-joined) AG will be mounted on the underside of the surface platform providing the means to calculate (via the processor) the exact position and aspect of the joined PAS and AG devices.

The ROV(s) is identical to such devices used by the oil industry for deep off-shore drilling but this unit's interface cables will be lengthened so it can travel greater than two miles from the platform. The ROV(s) provide the means to view, evaluate and move delayed fused under-sea explosives.

The Array Distribution Unit (ADU) function only acts as a convenient physical wire/cable distribution center.

The Data and Signal Formatter (D&SF) is an active electronic data and signal formatting device located on the platform.

The 'formatting includes:

Analogue to Digital conversion

Digital to Analogue conversion

Multiplexing and De-multiplexing into and from a single serial digital data interface cable.

The D&SF will have the minimum through-put capacity (bandwidth) to simultaneously handle:
From Sensors:
   Acoustic outputs of eight type AN/SSQ-53 Sonobuoys. Plus 50% (control, feedback, status, etc.).
To Sensors and Generators:
   Approximately 25% of the 'from sensors' bandwidth It is assumed devices matching/exceeding these requirements are available 'off-the shelf' (from Industry/US Government). The RF Data Link is a common device used by industry and the government. The device converts serial (cable media) electronic data/signals to RF for transmission to another location via an antenna and likewise receives RF and converts it to serial electronic data/signals.

The capacity (bandwidth) must be compatible with the required data/signals of the system, as identified for the D&SF.

It is assumed devices matching/exceeding these requirements are available 'off-the shelf' (from Industry/US Government).

*The above assumes a separate in-place ship to helicopter (LAMPS) data link.

The Processor includes a computer and specialized computer programs. The Processor provides critical functions related to the surface/sub-subsurface objects:
Detection
Position
Tracking
Classification
Threat Analysis
Related recommendations The processor also provides interface for the Display Monitor and Control Unit. The processor further provides for sensor position and aspect calibration, operator training via simulation and historical operational recording.

It is assumed the computers are in-place on the ship, or a computer matching/exceeding the required process capacity and speed are available 'off the shelf' commercially.

The 'specialized computer programs would have to be developed, but the USN utilizes similar functional software for their AAW, ASUW and ASW mission. If such were made available the development (time, cost and risk) would be reduced by an order of magnitude.

The Display Monitor and Control Unit (DM&CU) provides for the operator to system interface.

The Light Airborne Multi-Purpose System (LAMPS) is identical to that used by the USN for surface and sub-surface detection, localization and engagements.

Although specific operational displays, modes, functions or controls are not specified in detail at this time, it is assumed the DM&CU is in-place on the ship or a unit matching/exceeding the requirements is commercially available—large touch-screen monitor would well serve the all requirements.

It is understood that the preceding description is given merely by way of illustration and not in limitation of the invention and that various modifications may be made thereto without departing from the spirit of the invention as claimed.

What is claimed is:

1. A supplemental BOP assembly configured for preventing; containing and/or repairing blowouts during a well drilling process comprising: a remote controlled two port gate valve device and remote-controlled annular closing device; wherein the assembly is connected in series with, and vertically aligned with a stud pipe of a subsea well; wherein the assembly further contains an embedded pipe cutting assembly; said embedded pipe cutting assembly being embedded within the subsea well drilling equipment, wherein the assembly comprises at least one saw blade aligned perpendicular to a pipe to be cut, wherein the at least one saw blade is mechanically connected to at least one saw blade motor, wherein the at least one saw blade motor is mechanically connected to at least one lateral drive device; and wherein the at least one lateral drive device controls a horizontal position of the at least one saw blade in order to engage the at least one saw blade into the pipe to be cut.

2. The supplemental BOP assembly of claim 1, wherein the assembly further comprises at least one port above and at least one port below at least one closing element of the annular closing device, wherein the at least one port penetrates the a sidewall of an assembly housing and wherein each of at least one port further comprises a remote controlled valve device "s".

3. The supplemental BOP assembly of claim 1, comprising a control mechanism that allows for vertical and rotational movement of the pipe when the annular closing device is activated.

4. The supplemental BOP assembly of claim 1, wherein the assembly further comprises a remote controlled inner pipe gripping device that eliminates vertical movement of the inner pipe.

5. The supplemental BOP assembly of claim 4, wherein the remote-controlled inner pipe gripping device further comprises a remote-controlled drive device that vertically move s the inner pipe.

6. The supplemental BOP assembly of claim 1 wherein the embedded pipe cutting assembly at least one wedge device capable of supporting an upper section of a pipe being cut to insure the pipe does not jam the saw blade during the cutting process, and; wherein the at least one wedge device comprises at least one wedge at least one lateral drive device to control a horizontal position of the wedge device and drive the wedge into a pre-cut sector of the pipe.

* * * * *